(No Model.)

J. K. GRAHAM.
BEEFSTEAK TENDERER.

No. 563,271. Patented July 7, 1896.

Witnesses.
A. Ruppert.
Robert Lowe

Inventor.
Joseph K. Graham
Per
Thomas P. Simpson,
atty

THE NORRIS PETERS CO., PHOTO-LITHO., WASHINGTON, D. C.

UNITED STATES PATENT OFFICE.

JOSEPH K. GRAHAM, OF PORT ROYAL, PENNSYLVANIA.

BEEFSTEAK-TENDERER.

SPECIFICATION forming part of Letters Patent No. 563,271, dated July 7, 1896.

Application filed January 29, 1896. Serial No. 577,230. (No model.)

*To all whom it may concern:*

Be it known that I, JOSEPH K. GRAHAM, a citizen of the United States, residing at Port Royal, in the county of Juniata and State of Pennsylvania, have invented certain new and useful Improvements in Beefsteak-Tenderers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a meat-tenderer which will first perforate, so as to compress the fiber of the meat laterally, and then pound it, so as to compress it vertically, thus bruising and weakening the fiber, so as to make it tender and retentive of its juices.

Figure 1:
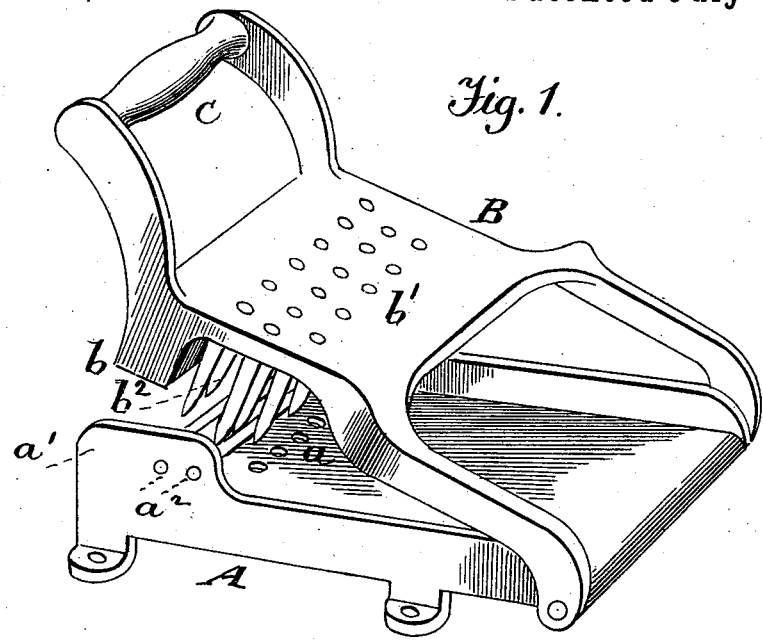
Figure 2:
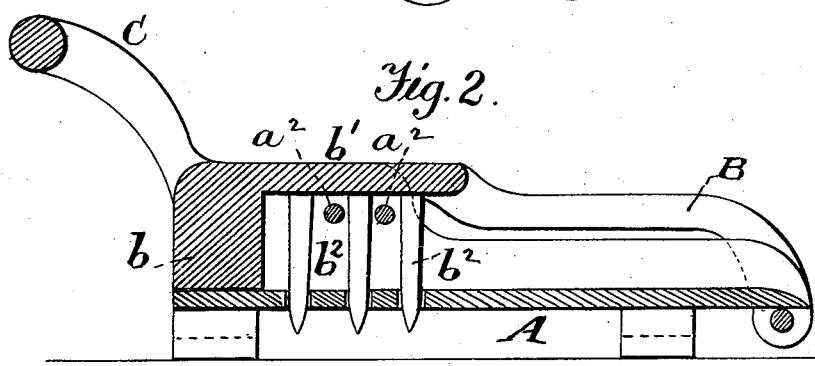

Figure 1 of the drawings is a perspective view of my tenderer with the perforator raised; Fig. 2, a vertical longitudinal section thereof, and Fig. 3 a perspective view showing how the tenderer may be operated by hand with a crank-wheel.

In the drawings, A represents the bottom stationary jaw provided with the holes $a$, placed at a short distance apart. $a'$ $a'$ are vertical flanges preferably arranged from six to ten inches from each other.

B is the hinged upper jaw having the pounder $b$ at its front end and just behind it the perforator $b'$, the latter consisting of pointed spikes $b^2$, which may be round or of any other form in cross-section. These spikes enter the holes $a$ below the meat and in passing upward have the meat stripped from them by the strippers $a^2$, which extend across from one flange $a'$ to the other. These strippers also perform the function of limiting the downward motion of the jaw B.

Figure 3:
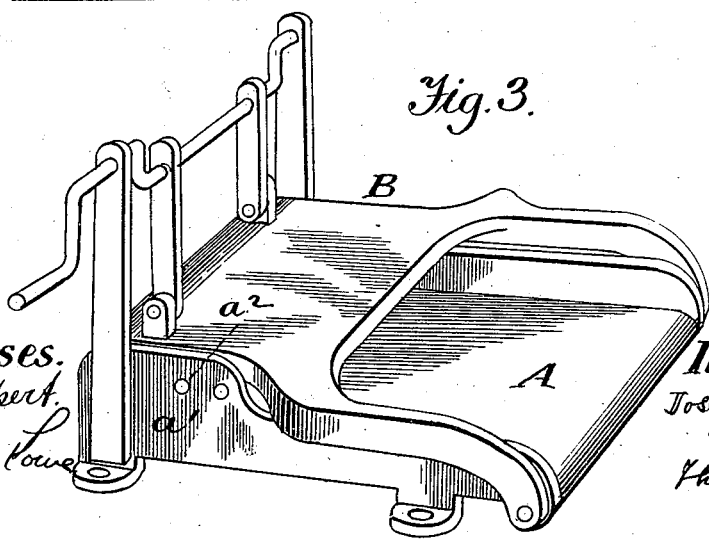

C is an integral or attached handle by which the hinged jaw B may be worked up and down, while, if desired, the same may be done by means of the hand mechanism illustrated in Fig. 3 of the drawings.

I am aware that pounders and perforators have each been separately used in meat-tenderers, but I have so combined these instrumentalities that while the meat is being pounded to bruise and weaken the fibers, they are also perforated and divided, so as to be much more easily masticated.

What I claim as new, and desire to protect by Letters Patent, is—

In a meat-tenderer the combination of the bottom stationary jaw A having perforations $a$, parallel sides $a'$ $a'$; and cross-rods $a^2$ $a^2$, the hinged upper jaw B having the pounder $b$ and the perforators $b'$ adjacent thereto; whereby the meat may be both pounded and perforated as the upper jaw is brought down between the flanges of the lower jaw and the perforators pass through the holes thereof, as shown and described.

In tetimony whereof I affix my signature in presence of two witnesses.

JOSEPH K. GRAHAM.

Witnesses:
  JACOB GRENINGLE,
  GEORGE C. RUNKLE.